United States Patent [19]

Benker et al.

[11] Patent Number: 4,987,440
[45] Date of Patent: Jan. 22, 1991

[54] METHOD OF AND APPARATUS FOR POSITIONING IMAGE AREAS OF FILM

[75] Inventors: Gerhard Benker, Pullach; Wilhelm Nitsch, Munich; Bernd Payrhammer, Munich; Volker Weinert, Munich; Helmut Treiber, Munich; Ulrich Klüter, Munich, all of Fed. Rep. of Germany

[73] Assignee: Agfa Gevaert AG, Leverkusen, Fed. Rep. of Germany

[21] Appl. No.: 415,066

[22] Filed: Sep. 29, 1989

[30] Foreign Application Priority Data

Oct. 4, 1988 [DE] Fed. Rep. of Germany ....... 3833731

[51] Int. Cl.$^5$ .................... G03B 27/32; G03B 27/52
[52] U.S. Cl. ........................................ 355/41; 355/77; 355/38; 250/559
[58] Field of Search ................. 355/41, 68, 77, 38; 250/559, 561, 571

[56] References Cited

U.S. PATENT DOCUMENTS

| | | | |
|---|---|---|---|
| 4,167,678 | 9/1979 | Mischo et al. | 250/559 |
| 4,565,442 | 1/1986 | Benker et al. | 355/68 |
| 4,727,399 | 2/1988 | Matsumoto | 355/41 |

Primary Examiner—L. T. Hix
Assistant Examiner—D. Rutledge
Attorney, Agent, or Firm—Peter K. Kontler

[57] ABSTRACT

An exposed and developed photographic filmstrip having a series of image areas is conveyed along a path and is photoelectrically scanned at a first location of the path to detect regions characterized by marked density jumps. A signal is generated in response to detection of each such characteristic region and a first distance measuring device disposed near the first location assigns a first distance reading to each characteristic region upon detection thereof. The first distance readings are representative of the positions of the characteristic regions longitudinally of the filmstrip. Each signal is stored together with the respective first distance reading. The stored signals and first distance readings are used to calculate the positions of the image areas longitudinally of the filmstrip, and the calculated positions are likewise stored. From the first location, the filmstrip travels to a second location of the path where a notch is punched in the filmstrip adjacent to each image area. Immediately upstream of the second location, the filmstrip is photoelectrically scanned for a second time to again detect the characteristic regions.

32 Claims, 1 Drawing Sheet

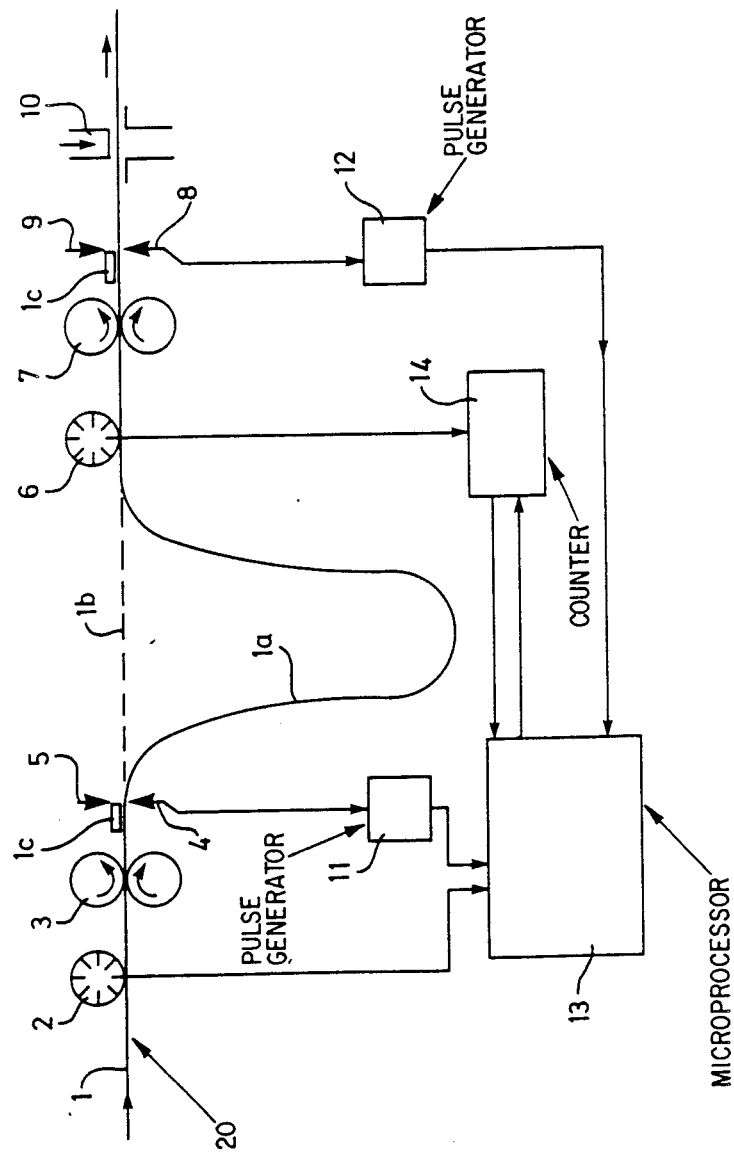

METHOD OF AND APPARATUS FOR POSITIONING IMAGE AREAS OF FILM

CROSS-REFERENCE TO RELATED APPLICATION

This application contains subject matter similar to that in Ser. No. 415,065 filed Sept. 29, 1989 U.S. Pat. No. 4,947,205, by Gerhard Benker et al. for "Method of and apparatus for positioning photographic originals in a copying station. for

BACKGROUND OF THE INVENTION

The invention relates generally to the treatment of exposed and developed strips of photosensitive material, especially photographic filmstrips, having a series of image areas.

More particularly, the invention relates to a method in which an exposed and developed strip of photosensitive material with a series of image areas is conveyed along a predetermined path for treatment. During travel along the path, the photosensitive material passes by a scanning station in order to determine the positions of the image areas. Scanning of the photosensitive material may, for example, be performed photoelectrically via a scanning slit which extends perpendicular to the direction of travel of the photosensitive material. A processing station is situated downstream of the scanning station and is spaced from the latter by a distance which at least equals the combined length of several image areas. At the processing station, an operation is performed on the photosensitive material at locations corresponding to the image areas. Movement of an image area from the scanning station to the processing station is controlled by measurement of the distance traveled by the photosensitive material.

The invention also relates to an apparatus for operating with an exposed and developed strip of photosensitive material having a series of image areas. The apparatus includes a mechanism for transporting the photosensitive material along a predetermined path and a scanning station at which the photosensitive material is scanned, e.g., photoelectrically via a scanning slit extending transversely of the direction of travel of the photosensitive material, as the photosensitive material moves along the path. A memory is provided for storing the measurements obtained at the scanning station in correlation to the longitudinal coordinates of the regions from which the respective measurements were derived. The apparatus further includes a processor for calculating the longitudinal coordinates of the image areas based on the measurements obtained from a section of the photosensitive material having several image areas. A processing station is disposed downstream of the scanning station by a distance at least equal to the combined length of several image areas and has means for performing an operation on the photosensitive material at locations corresponding to the image areas. The apparatus additionally includes a device for measuring the distance of travel of the photosensitive material and movement of an image area from the scanning station to the processing station is controlled using measurements derived from such device.

A method and an apparatus of the type outlined above are known from the West German Patent No. 27 05 097. To calculate the longitudinal coordinates of the image areas, the distance between detectable, respective leading and trailing edges of the image areas are taken as the "true image area length". This makes it possible to locate less readily detectable second edges of image areas having a first edge which is readily detectable.

In the apparatus of the West German Patent, the scanning location is not the same as the processing location where a notch is applied to the margin of the photosensitive material in order to position the image areas in a copier. The spacing between the scanning location and the processing location can be used with advantage to increase the accuracy with which the edges of the image areas are located. After initial detection of a transparency jump indicative of an image area edge, it is advantageous to examine an additional section of the photosensitive material in order to determine whether this transparency jump is not due to a vertical, poorly illuminated telegraph pole which causes a transparency jump similar to that of an image area edge. Recognition of the image area edges with an adequate degree of reliability is thus possible only after examination of an additional test section having a length at least equal to that of an image area. The reliability with which the image area edges can be detected is increased when a section of the photosensitive material containing several image areas, and especially when the entire strip of photosensitive material, is examined using the knowledge of image area length, i.e., the distance from the leading to the trailing edge of an image area, and the width of the bands separating neighboring image areas. However, this requires very precise monitoring of the distance traveled as the photosensitive material moves from the phoeoelectric scanning station or measuring station to the processing station. Measurement of the distance traveled is normally accomplished by converting the rotational motion of friction rolls which engage the photosensitive material into pulses or by means of a counter for the pulses delivered to a stepping motor constituting part of the drive mechanism for the photosensitive material. For the measurement to be accurate, no slip should occur between the measuring rolls and the surface of the photosensitive material, and the measuring rolls, which are caused to rotate by friction, should not undergo changes in diameter due to wear. These two requirements are very difficult to satisfy simultaneously. As a rule, rolls having a high coefficient of friction are subject to wear and can also deform elastically. Wear-resistant rolls, on the other hand, have a smooth surface so that slip occurs readily. Furthermore, the pressure of the measuring or drive rolls cannot be increased arbitrarily since the photosensitive material can then be damaged Inasmuch as errors in measurement add up, precision in following movement of the photosensitive material is critical, particularly when the distance to be traveled by the photosensitive material is large.

OBJECTS AND SUMMARY OF THE INVENTION

It is an object of the invention to reduce the effects of slip on the transport of photosensitive material.

Another object of the invention is to reduce the effects of wear on the transport of photosensitive material.

An additional object of the invention is to reduce slip effects and wear effects, as well as the negative influences of the same, on the precision of measurement of the distance traveled by photosensitive material, particularly when the photosensitive material travels between two locations, such as a scanning station and a processing station, which are separated by a relatively large distance.

A further object of the invention is to provide a method which allows an image area of a strip of photosensitive material to be positioned at a predetermined location with greater accuracy.

It is also an object of the invention to provide an apparatus which makes it possible to position an image area of a strip of photosensitive material at a predetermined location with greater accuracy.

The preceding objects, as well as others which will become apparent as the description proceeds, are achieved by the invention.

One aspect of the invention resides in a method of positioning image areas of an exposed and developed strip of photosensitive material, especially a photographic filmstrip. The photosensitive material is conveyed along a predetermined path and is scanned at a first location of the path to detect characteristic regions associated with the image areas. For example, the characteristic regions may include edges of the image areas and/or abrupt changes of density within the image areas. A signal is generated in response to detection of each characteristic region and a first position coordinate is established for the respective region upon passage by the first location. The first position coordinate may be indicative of the position of the respective region longitudinally of the photosensitive material. A second position coordinate is calculated for each image area using the signals and first position coordinates for the characteristic regions, and such second position coordinates may again represent the positions of the image areas longitudinally of the photosensitive material. The signals generated in response to detection of the characteristic regions are stored in correlation to the respective first position coordinates. The distance traveled by the photosensitive material is measured and each of the image areas is positioned at a second location of the path using the second position coordinates and the measured distance of travel of the photosensitive material. Preferably, the second location is disposed downstream of the first location by a distance which at least equals the combined length of a plurality of the image areas. The step of positioning the image areas at the second location of the path includes checking the measured distance of travel of the photosensitive material using the signals and first position coordinates for the characteristic regions.

The scanning step is preferably performed photoelectrically. The photosensitive material may be conveyed along its path lengthwise and the scanning step may then involve successively scanning strip-like segments of the photosensitive material extending widthwise of the latter. This can be accomplished, for instance, by scanning the photosensitive material via a scanning slit which is perpendicular to the direction of travel of the material. Each of the segments advantageously has a width, as considered lengthwise of the photosensitive material, which is small in relation to the length of the photosensitive material.

The method may further comprise the step of operating on the photosensitive material at positions thereof which correspond to the image areas and this step is performed at the second location of the path of the photosensitive material.

The distance traveled by the photosensitive material may be measured using friction rolls which engage, and are caused to rotate by, the photosensitive material. In the method of the invention, the influence of the friction rolls on the distance measurement, which is prone to error, is restricted to very short distances, namely, the distance traveled before detection of the first marked or abrupt density change and the distance traveled between the time that the last marked or abrupt density change is detected and the time of arrival at the desired location.

According to one embodiment of the method, the photosensitive material is scanned for a second time to detect characteristic regions which include image area edges and/or abrupt density changes within the image areas. The second scanning step is performed at a third location of the path of the photosensitive material downstream of the first location and upstream of the second location, preferably near the second location. Thus, the characteristic regions detected during the first scanning step are detected once more during the second scanning step. Moreover, an additional position coordinate is established for each characteristic region upon detection of the same for the second time and, as before, may be indicative of the position of the respective region longitudinally of the photosensitive material. The additional position coordinate assigned to each characteristic region during the second scanning of the photosensitive material can be compared to the respective first position coordinate stored in memory and, upon deviation of the additional position coordinate from the first position coordinate, the additional position coordinate can be corrected in accordance with the difference between the coordinates. The first position coordinates for the characteristic regions can be established using a first device designed to measure the distance of travel of the photosensitive material while the additional position coordinates can be established using a second distance measuring device. The step of correcting the additional position coordinates then involves correction of the second distance measuring device. When the additional position coordinate of a characteristic region differs from the first position coordinate, correction of the second distance measuring device may entail changing the reading of such device to that which existed in the first distance measuring device upon initial detection of the respective characteristic region.

Another aspect of the invention resides in an apparatus for operating with an exposed and developed strip of photosensitive material, particularly a photographic filmstrip, having a series of image areas. The apparatus comprises means for conveying the photosensitive material along a predetermined path and means for scanning the photosensitive material at a first location of the path to detect characteristic regions associated with the image areas, e.g., regions with an abrupt density change. The scanning means is designed to generate a signal in response to detection of each characteristic region. It is preferred for the scanning means to be arranged such that the scanning means can scan the image areas of the photosensitive material as the latter travels along its path and the scanning means is advantageously designed to detect density changes. The apparatus further comprises means for establishing a first position coordinate for each characteristic region upon detection by the scanning means and measuring the distance of travel of the photosensitive material. Control means is operatively associated with the scanning means and the establishing and measuring means, and the control means includes memory means designed to store each of the signals generated upon detection of a characteristic region in correlation to the first position coordinate of the respective region. The control means is programmed to: (i) calculate a second position coordinate for each of the image areas using the signals and first position coordinates for the characteristic regions, (ii) temporarily position each of the image areas at a second location of the path using the second position coordinates and the measured distance of travel of the photosensitive material, and (iii) check the measured distance of travel of the photosensitive material using the signals and first position coordinates for the characteristic regions. The second location at which the image areas are temporarily positioned is preferably situated downstream of the first location by a distance which at least equals the combined length of a plurality of the image areas.

The scanning means may be photoelectric. Furthermore, the scanning means may include a scanning slit extending transversely of the path of the photosensitive material so that the scanning means can successively scan strip-like segments of the photosensitive material as the latter travels along its path. The scanning slit is preferably narrow so that the width of each segment, as considered lengthwise of the photosensitive material, is small in relation to the length of the photosensitive material.

The apparatus may comprise means at the second location of the path of the photosensitive material for operating on the photosensitive material at positions thereof corresponding to the image areas.

According to one embodiment of the invention, the apparatus may include an additional means for scanning the photosensitive material to again detect the characteristic regions. The establishing and measuring means includes means for assigning an additional position coordinate to each characteristic region upon renewed detection thereof. The additional scanning means and at least part of the assigning means are disposed between the first and second locations of the path of the photosensitive material, and preferably remote from the first location and near the second location. Moreover, the additional scanning means and assigning means are operatively associated with the control means, and the control means is programmed to compare each additional position coordinate with the respective first position coordinate stored in the memory means and, upon deviation of the additional position coordinate from the first position coordinate, to change the assigning means. If the additional position coordinate of a characteristic region as determined by the assigning means differs from the first position coordinate, the control means may operate to change the reading of the assigning means from the additional position coordinate to the first position coordinate.

The apparatus of the invention is particularly well-suited for carrying out the method in accordance with the invention.

The novel features which are considered as characteristic of the invention are set forth in particular in the appended claims. The improved method, as well as the construction and mode of operation of the improved apparatus, will, however, be best understood upon perusal of the following detailed description of certain specific embodiments when read in conjunction with the accompanying drawing.

BRIEF DESCRIPTION OF THE DRAWING

The single FIGURE schematically illustrates an apparatus according to the invention for operating with exposed and developed strips of photosensitive material having a series of image areas.

DESCRIPTION OF THE PREFERRED EMBODIMENTS

The FIGURE shows an apparatus in accordance with the invention for operating with exposed and developed strips of photosensitive material having a series of image areas. The reference numeral 20 identifies a band of photosensitive material which is conveyed from left to right along a horizontal path as seen in the FIGURE by a first pair of transporting rolls 3 and a second pair of transporting rolls 7. The transporting rolls 3 and 7 are driven by a suitable motor which may, for example, be a stepping motor.

The band 20 is made up of several individual strips 1 of photosensitive material which are joined end-to-end by adhesive bands 1c such as hot sealing bands. Thus, the leading end of the strip 1 extending between the two adhesive bands 1c shown in the FIGURE is connected to the trailing end of the preceding strip 1 while the trailing end of the strip 1 extending between the two bands 1c is connected to the leading end of the following strip 1. Each of the strips 1 is here assumed to be an exposed and developed photographic filmstrip having a series of image areas or exposures which are separated from one another by unexposed bands of the filmstrips. The filmstrips 1 are joined by the adhesive bands 1c to form the long band 20 in order to simplify processing of the filmstrips 1. The band 20 and the filmstrips 1 are conveyed through the apparatus lengthwise.

The filmstrips 1 may be of the type which are provided with apertures having positions unrelated to the positions of the image areas. Representative of this type of filmstrip is film Type 135 having transporting apertures with no positional relationship to the image areas. It is also possible for the filmstrips 1 to be imperforate as is the case, by way of example, for film Type 120.

The apparatus is provided with a conventional film guide for the band 20 and such film guide has been omitted here to preserve clarity. As the band 20 enters the apparatus, it first passes below a distance measuring device 2 which functions to measure the distance traveled by the band 20. The distance measuring device 2 may, for instance, include a roll connected to a perforated disc and a light barrier which serves to detect the perforation or perforations in the disc. The light barrier emits a series of pulses in response to detection of the perforation or perforations in the disc and such pulses are a measure of the distance traveled by the band 20. The transporting rolls 3 follow the distance measuring device 2 as considered in the direction of movement of the band 20. If the motor which drives the transporting rolls 3 is a stepping motor, the distance measuring device 2 can take the form of a counter which counts the control pulses delivered to the motor.

A photoelectric scanning or measuring unit 4 is located adjacent to the path of the band 20 downstream of the transporting rolls 3. The scanning unit 4 is arranged to scan the image areas of the band 20 and is designed to measure the density of, or density changes in, the band 20. The scanning unit 4 includes an illuminated scanning or measuring slit which is relatively narrow, e.g., 0.2 mm wide, and extends at right angles to the band 20 and its path of travel. The measuring slit makes it possible to successively scan strip-like segments of the band 20 extending transversely thereof and having widths, as considered lengthwise of the band 20, which are small in relation to the lengths of the filmstrips 1. The scanning unit 4 generates an intensity or density signal for the segment of the band 20 in register with the scanning slit and, upon continuous scanning of the band 20, this signal indicates the density pattern along the band 20. Marked or abrupt changes in the density pattern, i.e., density jumps, allow the ends of the image areas, that is, so-called image area edges, to be readily recognized. However, similar abrupt changes or jumps in the density pattern can also be caused by density jumps or abrupt density changes within the image areas, e.g., density jumps due to brightly illuminated edges of houses against a dark background, density jumps due to telegraph poles, and the like.

Opposite the scanning or density measuring unit 4 is a sensor 5 for detection of the adhesive bands 1c which join neighboring filmstrips 1 of the band 20 to one another. As a rule, adhesive bands 1c constituted by hot sealing bands are opaque to infrared radiation and can be accurately detected by infrared sensors. Accordingly, the sensor 5 may be constituted by an infrared sensor when the adhesive bands 1c are constituted by hot sealing bands.

Downstream of the scanning unit 4 and the sensor 5, and spaced therefrom by a certain minimum distance, is a second distance measuring device 6 which can be identical to the first distance measuring device 2. The second pair of transporting rolls 7, which correspond to the pair of transporting rolls 3 and can be driven by the motor 15, follows the second distance measuring device 6. A second scanning or density measuring unit 8, which can be designed in the same manner as the first scanning unit 4, is disposed behind the transporting rolls 7 and a second sensor 9 for detection of the adhesive bands 1c is situated opposite the second scanning unit 8. The second sensor 9 can be identical to the first sensor 5.

A station for processing or operating on the band 20 is situated downstream of the second scanning unit 8 and the second sensor 9. In the illustrated embodiment, this station constitutes a punching station and contains a punching unit 10 which functions to punch out half moon-shaped cutouts in one of the longitudinal margins of the band 20 at positions corresponding to the image areas of the band 20. The cutouts may be used to position the image areas of the band 20 in a copying window of a roll copier or to position the band 20 in a cutting machine. The band 20 may be coiled upon leaving the punching unit 10 or may travel directly into a roll copier.

The portion of the path of the band 20 between the first group of sensing means including the first scanning unit 4 and the first sensor 5 and the second group of sensing means including the second scanning unit 8 and the second sensor 9 is variable. The reference character 1b denotes the shortest path between the first and second groups of sensing means whereas the reference character 1a denotes the longest path between the two groups of sensing means. As indicated by the broken line at 1b, the band 20 is straight when it follows the shortest path from the first to the second group of sensing means. On the other hand, the full line at 1a shows that the band 20 forms a loop upon traveling from the first to the second group of sensing means along the longest path between these groups. The length of the path between the two groups of sensing means can, for example, be varied by changing the relative speed of the transporting rolls 3 and 7. As the length of the path between the first and second groups of sensing means increases from 1b, a progressively larger loop forms in the band 20.

The length of the shortest path 1b between the first and second groups of sensing means is at least equal to the combined length of a plurality of the image areas of the band 20. Preferably, however, the length of the path 1b equals or approximates the length of the shortest filmstrip 1 to be processed in the apparatus.

The distance measuring device 2 is directly connected to a control unit or microprocessor 13 while the first scanning unit 4 is connected to the microprocessor 13 via a pulse generator or pulse former 11. Similarly to the first scanning unit 4, the second scanning unit 8 is connected to the microprocessor 13 by means of a pulse generator or pulse former 12. The pulse generators 11,12 are designed to form short, rectified pulses of different magnitudes from density jumps having a certain minimum magnitude and each of the pulse generators 11,12 may, for example, include a differentiating unit, a rectifier and a threshold switch. The minimum magnitude of the density jumps is smaller than that existing at the edges of the image areas of the band 20.

The second distance measuring device 6 is connected to a step counter 14. The counter 14, in turn, is connected to the microprocessor 13 in such a manner that the readings of the counter 14 can be transmitted to the microprocessor 13 and that the microprocessor 13 can change the reading of the counter 14.

The operation of the above-described apparatus is as follows:

The apparatus is designed to calculate the positions of the image areas along a filmstrip 1 as accurately as possible using all information available from the filmstrip 1 or from at least a large number of the image areas of the filmstrip 1. Since the punching operation with the punching unit 10 requires a knowledge of the positions of the image areas, the punching operation should thus begin only after all of the information available from the filmstrip 1, or from at least part of the filmstrip 1, has been fed into the microprocessor 13 by the first scanning unit 4. It is preferred to calculate the positions of the image areas using all information available from the filmstrip 1 and, in such an event, the punching operation is inhibited until the entire filmstrip 1 has been scanned by the first scanning unit 4, that is, until the adhesive band 1c at the trailing end of the filmstrip 1 has reached the first sensor 5. Only then is the adhesive band 1c at the leading end of the filmstrip 1 permitted to pass by the second sensor 9 and to the punching unit 10.

The different types of films come in various lengths so that the band 20 may include filmstrips 1 ranging in length from some minimum value to some maximum value. For example, cartridges of so-called small format or Type 135 film are available with 36, 24 and 12 exposures. In order that the portion of the path of the band 20 between the first sensor 5 and the second sensor 9 may accommodate a single filmstrip 1 having any length from the minimum value to the maximum value, the length of this portion of the path is variable as explained above. The shortest path 1b between the sensors 5 and 9, in which the band 20 is straight, preferably has a length which equals or approximates the length of the shortest filmstrip 1 to be processed. On the other hand, the longest path 1a between the sensors 5 and 9, in which the band 20 forms a loop of maximum size, preferably has a length which at least equals the length of the longest filmstrip 1 to be processed. The path 1a passes through a suitable chamber in which the loop of the band 20 can be freely suspended. The two marginal portions of the loop are supported in a conventional manner by non-illustrated deflecting rolls.

During scanning of a filmstrip 1, a signal is generated for each marked density jump, i.e., each density change exceeding a certain minimum value established by a threshold switch, detected by the scanning unit 4. A first position coordinate is also assigned to each of the marked density jumps detected by the scanning unit 4. The first position coordinate, which represents the position of the respective density jump longitudinally of the filmstrip 1, is the distance reading of the first distance measuring device 2 at the time the density jump is detected by the scanning unit 4. The microprocessor 13 is provided with a memory and the signal generated for each of the marked density jumps along the filmstrip 1 is stored in the memory together with the respective first position coordinate. The microprocessor 13 then calculates second position coordinates for the image areas of the filmstrip 1 by means of a suitable program which uses the signals and first position coordinates obtained during scanning of the filmstrip 1 by the scanning unit 4. By way of example, the second position coordinates can be calculated via the program disclosed in the West German Patent No. 27 05 097. The second position coordinates, which are indicative of the positions of the image areas longitudinally of the filmstrip 1, are then stored.

Once the position coordinates of the image areas have been calculated, the arrival of any image area of the filmstrip 1 at the second sensor 9 can be determined by measuring the distance traveled by the filmstrip 1 after the adhesive band 1c at the leading end of the filmstrip 1 has left the second sensor 9. Measurement of the distance traveled by the filmstrip 1 after the adhesive band 1c at the leading end thereof has left the second sensor 9 is performed by the second distance measuring device 6. However, when the measurements made by the second distance measuring device 6 rely on measuring rolls which are in frictional engagement with the filmstrip 1, the measurements are subject to error due to slippage of the measuring rolls relative to the filmstrip 1, deformation of the measuring rolls and/or wear of the measuring rolls. The errors in measurement increase with increasing distance of the leading adhesive band 1c downstream of the second sensor 9, that is, with increasing distance of travel of the filmstrip 1. In order to compensate for the errors in measurement, the marked density jumps previously detected by the first scanning unit 4 are again detected by the second scanning unit 8. A pulse is sent to the microprocessor 13 for each of the marked density jumps detected by the scanning unit 8. The microprocessor 13 thereupon compares the first position coordinate obtained for the respective density jump during the initial scanning of the filmstrip 1 with the reading of the counter 14 upon detection of the density jump by the second scanning unit 8. This reading of the counter 14 represents an additional position coordinate for the respective density jump, that is, an additional coordinate indicative of the position of the respective density jump along the filmstrip 1. Such a check on the measurement accuracy of the distance traveled by the filmstrip 1 can be carried out for each density jump registered in the memory of the microprocessor 13. If a difference exists between the first position coordinate stored in the microprocessor 13 and the reading of the counter 14, the reading of the counter 14 is corrected by changing the reading to that which existed in the first distance measuring device 2 upon detection of the respective density jump by the first scanning unit 4, i.e., by changing the reading of the counter 14 to the first position coordinate stored in the microprocessor 13 for the respective density jump. In this manner, the reading of the counter 14 is constantly checked and, if necessary, corrected upon arrival of each image area edge, and also of regions containing marked density jumps, at the second scanning unit 8.

If the constant comparisons and corrections performed with the readings of the counter 14 indicate that the differences between the measurements of the distance measuring devices 2 and 6 are proportional to the distance traveled by the filmstrip 1, the error in distance traveled can be further reduced by linear extrapolation in the microprocessor 13 beyond the last marked density jump before arrival at the desired location, i.e., before arrival at the punching unit 10.

It will be understood that the distance measurements of the first distance measuring device 2 are also subject to error. However, this has no effect on the accuracy with which the image areas are positioned at the punching unit 10 as long as the distances readings of the two distance measuring devices 2 and 6 are kept the same by constant monitoring.

In the procedure outlined above, the adhesive band 1c at the leading end of a filmstrip 1 is held at the second sensor 9 until the adhesive band 1c at the trailing end of the same filmstrip 1 arrives at the first sensor 5. The description of this procedure has been simplified in order to provide a better understanding of the invention. In practice, the memory of the microprocessor 13 must have a capacity sufficient to store position coordinates for the image area edges and density jumps of several filmstrips 1 in order to carry out the desired procedure without interruptions. Coordination between data output and the corresponding filmstrips 1 is then effected by means of the adhesive bands 1c leaving the first sensor 5 as taught in the European Patent Application No. 0 141 391.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A method of positioning image areas of an exposed and developed strip of photosensitive material, comprising the steps of conveying said photosensitive material along a predetermined path; scanning said photosensitive material at a first location of said path to detect characteristic regions associated with said image areas; generating a signal in response to detection of each of said regions; establishing a first position coordinate for each of said regions upon passage of the respective region by said first location; calculating a second position coordinate for each of said image areas using said signals and said first position coordinates; storing each of said signals in correlation to the respective first position coordinate; measuring the distance of travel of said photosensitive material; and positioning each of said image areas at a second location of said path using said second position coordinates and the measured distance of travel of said photosensitive material, the positioning step including checking the measurements obtained during the measuring step using said signals and said first position coordinates.

2. The method of claim 1, wherein each of said image areas has an edge and at least some of said regions include respective edges of said image areas.

3. The method of claim 1, wherein at least some of said regions include an abrupt change in density within an image area.

4. The method of claim 1, wherein the scanning step is performed photoelectrically.

5. The method of claim 1, wherein said photosensitive material is conveyed lengthwise and the scanning step comprises successively scanning strip-like segments extending widthwise of said photosensitive material, each of said segments having a width, as considered lengthwise of said photosensitive material, which is small in relation to the length of said photosensitive material.

6. The method of claim 1 wherein said second location is disposed downstream of said first location by a distance at least equaling the combined length of a plurality of said image areas.

7. The method of claim 1, wherein said photosensitive material comprises a photographic filmstrip.

8. The method of claim 1, further comprising the step of operating on said photosensitive material at positions of the latter corresponding to said image areas, the operating step being performed at said second location.

9. The method of claim 1, further comprising the steps of scanning said photosensitive material at a third location downstream of said first location and upstream of said second location to detect said regions, and establishing an additional position coordinate for each of said regions upon passage of the respective region by said third location; and wherein said checking comprises comparing each of said additional position coordinates with the respective first position coordinate.

10. The method of claim 9, further comprising the step of correcting an additional position coordinate upon deviation of the same from the respective first position coordinate.

11. The method of claim 10, wherein said correcting comprises changing an additional position coordinate to the respective first position coordinate.

12. The method of claim 9, wherein said third location is situated nearer said second location than said first location.

13. An apparatus for operating with an exposed and developed strip of photosensitive material, particularly a photographic filmstrip, having a series of image areas, comprising means for conveying the photosensitive material along a predetermined path; means for scanning the photosensitive material at a first location of said path to detect characteristic regions associated with the image areas, said scanning means being designed to generate a signal in response to detection of each characteristic region; means for establishing a first position coordinate for each characteristic region upon detection by said scanning means and measuring the distance of travel of the photosensitive material; and control means operatively associated with said scanning means and said establishing and measuring means, said control means including memory means designed to store each of said signals in correlation to the respective first position coordinate, and said control means being programmed to: (i) calculate a second position coordinate for each of the image areas using said signals and said first position coordinates; (ii) temporarily position each of the image areas at a second location of said path using said second position coordinates and the measured distance of travel of the photosensitive material, and (iii) check the measured distance of travel of the photosensitive material using said signals and said first position coordinates.

14. The apparatus of claim 13, wherein said scanning means is designed to detect density changes.

15. The apparatus of claim 13, wherein said scanning means is arranged to scan the image areas as the photosensitive material travels along said path.

16. The apparatus of claim 13, wherein said scanning means is photoelectric.

17. The apparatus of claim 13, wherein said scanning means comprises a scanning slit extending transversely of said path so that said scanning means can successively scan strip-like segments of the photosensitive material traveling along said path.

18. The apparatus of claim 13, wherein said second location is disposed downstream of said first location by a distance at least equaling the combined length of a plurality of image areas.

19. The apparatus of claim 13, further comprising means at said second location for operating on the photosensitive material.

20. The apparatus of claim 13, further comprising an additional means for scanning the photosensitive material to detect the characteristic regions thereof; and wherein said establishing and measuring means comprises means for assigning an additional position coordinate to each characteristic region upon detection by said additional scanning means, said additional scanning means and at least part of said assigning means being disposed between said first and second locations, and said additional scanning means and said assigning means being operatively associated with said control means, said control means being programmed to compare each additional position coordinate with the respective first position coordinate and, upon deviation of the additional position coordinate from the first position coordinate, to change said assigning means.

21. The apparatus of claim 20, wherein said control means is programmed to change said assigning means from an additional position coordinate to the respective first position coordinate upon deviation of the additional position coordinate from the first position coordinate.

22. The apparatus of claim 20, wherein said additional scanning means and said part of said assigning means are situated nearer said second location than said first location.

23. The apparatus of claim 20, further comprising pulse generating means between said control means and each of said scanning means.

24. The apparatus of claim 13, comprising means for varying the length of said path between said first and second locations.

25. The apparatus of claim 24, wherein said varying means comprises means for forming a loop in the photosensitive material.

26. The apparatus of claim 24 for strips of photosensitive material having lengths ranging from a minimum length to a maximum length, wherein said varying means is operative to vary the path length between said first and second locations from a first value to a larger second value equaling at least a substantial fraction of said maximum length.

27. The apparatus of claim 26, wherein said second value at least approximates said maximum length.

28. The apparatus of claim 26 for a band in which the leading end of a first strip of photosensitive material is connected to the trailing end of a second strip of photosensitive material by a first joint and the trailing end of the first strip is connected to the leading end of a third strip of photosensitive material by a second joint, further comprising first and second sensors along said path for detecting the joints, said first sensor being disposed nearer said first location than said second sensor and said second sensor being disposed nearer said second location than said first sensor.

29. The apparatus of claim 28, further comprising means at said second location for operating on the photosensitive material; and wherein said control means is programmed to prevent said operating means from acting on the first strip of photosensitive material until a plurality of the image areas of the first strip have passed by said scanning means.

30. The apparatus of claim 28, further comprising means at said second location for operating on the photosensitive material; and wherein said control means is programmed to prevent said operating means from acting on the first strip of photosensitive material until said first sensor detects the second joint.

31. The apparatus of claim 28, wherein said first sensor is disposed in the region of said scanning means; and further comprising an additional means for scanning the photosensitive material to detect the characteristic regions thereof, said establishing and measuring means including means for assigning an additional position coordinate to each characteristic region upon detection by said additional scanning means, and said additional scanning means and at least part of said assigning means being disposed between said first and second locations nearer said second location than said first location, said additional scanning means and said assigning means being operatively associated with said control means, and said control means being programmed to compare each additional position coordinate with the respective first position coordinate and, upon deviation of the additional position coordinate from the first position coordinate, to change said assigning means, said second sensor being disposed in the region of said additional scanning means.

32. The apparatus of claim 31, further comprising pulse generating means between said control means and each of said scanning means.

* * * * *